US010902195B2

(12) United States Patent
Hvezda et al.

(10) Patent No.: US 10,902,195 B2
(45) Date of Patent: *Jan. 26, 2021

(54) APPARATUSES, SYSTEMS, AND METHODS FOR PROVIDING A VISUAL PROGRAM FOR MACHINE VISION SYSTEMS

(71) Applicant: Cognex Corporation, Natick, MA (US)

(72) Inventors: Ales Hvezda, Natick, MA (US); Lou Palmieri, Natick, MA (US); Scott Schuff, Natick, MA (US); Dave Schumacher, Natick, MA (US)

(73) Assignee: Cognex Corporation, Natick, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/422,882

(22) Filed: May 24, 2019

(65) Prior Publication Data

US 2020/0034416 A1 Jan. 30, 2020

Related U.S. Application Data

(63) Continuation of application No. 15/241,521, filed on Aug. 19, 2016, now Pat. No. 10,303,757.

(51) Int. Cl.
G06F 17/00 (2019.01)
G06F 40/18 (2020.01)
(Continued)

(52) U.S. Cl.
CPC ........... G06F 40/18 (2020.01); G05B 19/048 (2013.01); G05B 19/058 (2013.01); G06F 8/34 (2013.01);
(Continued)

(58) Field of Classification Search
CPC .......... G06F 40/18; G06F 8/34; G06F 3/0482
See application file for complete search history.

(56) References Cited

U.S. PATENT DOCUMENTS 7,107,519 B1 9/2006 Webster et al.
7,603,652 B2 10/2009 Makowski et al.
(Continued)

FOREIGN PATENT DOCUMENTS

CN 104583946 A 4/2015

OTHER PUBLICATIONS

EP 17186522.3, Feb. 7, 2018, Extended European Search Report.
(Continued)

Primary Examiner — Scott T Baderman
Assistant Examiner — Barbara M Level
(74) Attorney, Agent, or Firm — Wolf, Greenfield & Sacks, P.C.

(57) ABSTRACT

Techniques include systems, computerized methods, and computer readable media for creating a graphical program in a graphical program development environment. A spreadsheet node having an input terminal in the graphical program is instantiated. The spreadsheet node is associated with a spreadsheet that specifies a list of functions to be executed in a computing device, and the input terminal is connected to the first terminal of the first node, indicating a data connection between the first terminal of the first node and the input terminal of the spreadsheet node. The input terminal of the spreadsheet node is associated with a first cell in the spreadsheet, indicating that the first cell in the spreadsheet be populated with any data received by the input terminal. A human readable file is generated specifying the graphical program, including the spreadsheet node.

22 Claims, 12 Drawing Sheets

(51) Int. Cl.
*G06F 8/34* (2018.01)
*G06F 9/451* (2018.01)
*H04N 5/232* (2006.01)
*G05B 19/048* (2006.01)
*G05B 19/05* (2006.01)
*G06Q 10/06* (2012.01)
*G06F 3/0482* (2013.01)

(52) U.S. Cl.
CPC ......... *G06F 9/451* (2018.02); *H04N 5/23203* (2013.01); *H04N 5/23216* (2013.01); *G06F 3/0482* (2013.01); *G06Q 10/06316* (2013.01)

(56) References Cited

U.S. PATENT DOCUMENTS

| 8,117,588 | B2 | 2/2012 | Kornerup et al. |
| 9,123,093 | B1 | 9/2015 | Schumacher |
| 10,303,757 | B2 | 5/2019 | Hvzeda et al. |
| 2002/0131633 | A1 | 9/2002 | Zwick et al. |
| 2002/0186245 | A1 | 12/2002 | Chandhoke et al. |
| 2004/0030435 | A1 | 2/2004 | Popp et al. |
| 2004/0030438 | A1 | 2/2004 | Popp et al. |
| 2006/0282818 | A1* | 12/2006 | DeSpain ................ G06F 40/18 717/109 |
| 2007/0168943 | A1 | 7/2007 | Marini et al. |
| 2008/0122799 | A1 | 5/2008 | Pryor |
| 2009/0113337 | A1 | 4/2009 | Rogers |
| 2011/0041067 | A1 | 2/2011 | Olson et al. |
| 2018/0052815 | A1 | 2/2018 | Hvzeda et al. |

OTHER PUBLICATIONS

Extended European Search Report dated Feb. 7, 2018 in connection with European ApplicationNo. 17186522.3.
[No Author Listed], Cognex: Spreadsheets and Image Acquisition—section 2. Cognex's documentation online. Mar. 16, 2016; pp. 1-17.
Kumar et al., Automatic Attendance System by Visual Programming Language LabVIEW. 1$^{st}$ IEEE International Conference on Power Electronics, Intelligent Control and Energy Systems (ICPEICES—2016). Jul. 4, 2016; pp. 1-5.
Sestoft, Implementing Function Spreadsheets. End-User Software Engineering. WEUSE IV, May 12, 2008; pp. 91-94.

* cited by examiner

```
{
  "$type": "ProjectContent",
  "ContentPath": "InSightToolBlock",     ← 1002
  "ContentTypeId": "SheetBlock",
  "Content": {
    "$type": "Dictionary",
    "SheetName": "Tasks_Task_InSightToolBlock",
    "OcrMaxAutoTuneModelData": [],
    "Config": {
      "$type": "SheetConfig",
      "SpreadsheetData": <DATA>,          ← 1004
      "NamedCells": [
        {                                  ← 1006
          "$type": "NamedCell",
          "Name": "Image",
          "DataType": "Image",
          "IsInput": true,
          "IsOutput": false,
          "IsTag": false,
          "IsReadOnly": true},
        {
          "$type": "NamedCell",
          "Name": "ImageView",
          "DataType": "View",
          "IsInput": false,
          "IsOutput": false,
          "IsTag": true,
          "IsReadOnly": true}
      ]},
```

FIG. 10A

```
"ImageProperties": {
  "$type": "InSightImageProperties",
  "ImageZoomMode": "Fit",
  "ImageScale": 0.30606995884773663,
  "ImageOrientation": "Normal",
  "GridOpacity": 0.75,
  "GridScale": 1.0,
  "ShowGrid": true,
  "ShowImageSaturation": false,
  "ShowGraphics": true,
  "ScrollOffset": "-302, 0"},
"NamedCells": [
  {
    "$type": "NamedCell",
    "Name": "Image",
    "DataType": "Image",
    "IsInput": true,
    "IsOutput": false,
    "IsTag": false,
    "IsReadOnly": true},
  {
    "$type": "NamedCell",
    "Name": "ImageView",
    "DataType": "View",
    "IsInput": false,
    "IsOutput": false,
    "IsTag": true,
    "IsReadOnly": true}
],
```

FIG. 10B

```
"SelectedDevice": "Devices.cam0",
"ShowViewPins": false,
"PropertyDefinitions": [
    {
        "$type": "BlockPropertyDefinition",
        "Name": "SelectedDevice",
        "IsInputPin": false,
        "IsOutputPin": false,
        "IsTag": false},
    {
        "$type": "BlockPropertyDefinition",
        "Name": "ShowViewPins",
        "IsInputPin": false,
        "IsOutputPin": false,
        "IsTag": false}
],
"Comment": null,
"Condition": null,
"OffsetX": 5522.5,
"OffsetY": 5233.03,
"OutputOperations": {
    "$type": "Dictionary"
},
"InputOperations": {
    "$type": "Dictionary"
},
"SubContents": []
},
```

FIG. 10C

APPARATUSES, SYSTEMS, AND METHODS FOR PROVIDING A VISUAL PROGRAM FOR MACHINE VISION SYSTEMS

CROSS REFERENCE TO RELATED APPLICATIONS

This Application is a Continuation of U.S. patent application Ser. No. 15/241,521, filed Aug. 19, 2016, entitled "APPARATUSES, SYSTEMS, AND METHODS FOR PROVIDING A VISUAL PROGRAM FOR MACHINE VISION SYSTEMS." The entire contents of this application are incorporated herein by reference in their entirety.

TECHNICAL FIELD

Disclosed herein are apparatus, systems, and methods that relate to programming a machine vision system using a graphical program.

BACKGROUND

A machine vision system is becoming a popular tool to replace human vision in a wide range of applications, such as manufacturing operations. A machine vision system typically provides automated, computer-based image acquisition and analysis capabilities that can be employed for tasks such as measurement and inspection of parts or materials. For such tasks, a machine vision system is typically configured with a camera for acquiring an image of an object of interest, e.g., a part being produced, and further is configured with processing functionality to process the acquired image and produce information about the object. The camera and/or the processing functionality can be programmed to adapt the operation of the machine vision system, including the camera and/or the processing functionality, to the applications of interest.

As machine vision systems become popular in various applications, it is often desirable for machine vision systems to be used and programmed by users with little (or no) programming expertise. Therefore, it is desirable to provide a program development environment for machine visions systems that is suited to a large spectrum of users.

SUMMARY

In accordance with the disclosed subject matter, apparatus, systems, and methods are provided for programming a machine vision system using a graphical program.

Some embodiments include a computer-implemented method for creating a graphical program in a graphical program development environment. The method includes providing the graphical program in the graphical program development environment, wherein the graphical program comprises a first node having a first terminal. The method includes instantiating a spreadsheet node having an input terminal in the graphical program, wherein the spreadsheet node is associated with a spreadsheet that specifies a list of functions to be executed in a computing device, and the input terminal is connected to the first terminal of the first node, indicating a data connection between the first terminal of the first node and the input terminal of the spreadsheet node. The method includes associating the input terminal of the spreadsheet node with a first cell in the spreadsheet, indicating that the first cell in the spreadsheet be populated with any data received by the input terminal. The method includes generating a human readable file specifying the graphical program including the spreadsheet node.

Some embodiments include a system for creating a graphical program in a graphical program development environment. The system includes a processor in communication with a memory, wherein the processor is configured to run a computer program stored in the memory that is configured to provide the graphical program in the graphical program development environment, wherein the graphical program comprises a first node having a first terminal. The program is configured to instantiate a spreadsheet node having an input terminal in the graphical program, wherein the spreadsheet node is associated with a spreadsheet that specifies a list of functions to be executed in a computing device, and the input terminal is connected to the first terminal of the first node, indicating a data connection between the first terminal of the first node and the input terminal of the spreadsheet node. The program is configured to associate the input terminal of the spreadsheet node with a first cell in the spreadsheet, indicating that the first cell in the spreadsheet be populated with any data received by the input terminal. The program is configured to generate a human readable file specifying the graphical program including the spreadsheet node.

Some embodiments include a non-transitory computer readable medium having executable instructions associated with a system for creating a graphical program in a graphical program development environment. The instructions are operable to cause the system to provide the graphical program in the graphical program development environment, wherein the graphical program comprises a first node having a first terminal. The instructions are operable to cause the system to instantiate a spreadsheet node having an input terminal in the graphical program, wherein the spreadsheet node is associated with a spreadsheet that specifies a list of functions to be executed in a computing device, and the input terminal is connected to the first terminal of the first node, indicating a data connection between the first terminal of the first node and the input terminal of the spreadsheet node. The instructions are operable to cause the system to associate the input terminal of the spreadsheet node with a first cell in the spreadsheet, indicating that the first cell in the spreadsheet be populated with any data received by the input terminal. The instructions are operable to cause the system to generate a human readable file specifying the graphical program including the spreadsheet node.

In some embodiments, the human readable file is transferred to a controller that is configured to execute the graphical program specified in the human readable file. An execution property of the spreadsheet node can be received indicating the computing device designated to execute the computer-readable instructions of the spreadsheet node. An execution property of the first node can be received indicating that the computing device is designated to execute computer-readable instructions of the first node. It can be determined, at the controller, based on the execution property of the spreadsheet node, that the computing device is designated to execute the computer-readable instructions of the spreadsheet node, and the computer-readable instructions of the spreadsheet node can be transmitted to the computing device for execution of the computer-readable instructions of the spreadsheet node.

In some embodiments, upon receiving a request to view the spreadsheet associated with the spreadsheet node, the spreadsheet in the graphical program development environment is displayed, first data to be associated with a second cell in the spreadsheet is received, and the second cell in the spreadsheet is populated using the first data. The computing device can be a camera. The graphical program can be configured to perform a machine vision task. The computer-readable instructions of the spreadsheet node can be designed to perform machine vision analysis of an image. The input terminal of the spreadsheet node can be configured to receive the image from the first terminal of the first node.

In some embodiments, a second spreadsheet node is provided in the graphical program, wherein the second spreadsheet node is associated with a second spreadsheet designed to be executed at another computing device. The spreadsheet node can include an output terminal, wherein the output terminal is associated with a second cell in the spreadsheet indicative of an output of the computer-readable instructions of the spreadsheet node. The output terminal of the spreadsheet node can be connected to a terminal of a second node of the graphical program to provide the output to the terminal of the second node of the graphical program.

In some embodiments, a visualization interface is provided having a graphical element, and associating the graphical element with a second cell in the spreadsheet to display a content of the second cell at the graphical element. The content of the second cell can include an image, and wherein associating the graphical element with the second cell can include assigning, to the graphical element, a pointer that references the image. A portion of the spreadsheet can be displayed in the graphical element of the visualization interface. A request to modify a cell of the spreadsheet can be received using the visualization interface.

In some embodiments, the computer-readable instructions of the spreadsheet node are executed at the computing device, wherein executing the computer-readable instructions includes receiving a pointer to first data to be processed by the computing device, determining whether the computing device maintains the first data locally at the computing device, upon determining that the first data is maintained locally at the computing device, processing the first data, and upon determining that the first data is not maintained locally at the computing device, retrieving the first data from a storage medium referenced by the pointer and processing the first data. The computing device can include a plurality of computing modules, and wherein the method further comprises automatically selecting one or more of the computing modules to execute the computer-readable instructions of the spreadsheet node. Automatically selecting the one or more of the computing modules can include determining a computation load of the one or more of the computing modules.

There has thus been outlined, rather broadly, the features of the disclosed subject matter in order that the detailed description thereof that follows may be better understood, and in order that the present contribution to the art may be better appreciated. There are, of course, additional features of the disclosed subject matter that will be described hereinafter and which will form the subject matter of the claims appended hereto. It is to be understood that the phraseology and terminology employed herein are for the purpose of description and should not be regarded as limiting.

BRIEF DESCRIPTION OF THE DRAWINGS

Various objects, features, and advantages of the disclosed subject matter can be more fully appreciated with reference to the following detailed description of the disclosed subject matter when considered in connection with the following drawings, in which like reference numerals identify like elements.

FIGS. 10A-10C show an exemplary object for a spreadsheet node, according to some embodiments.

DETAILED DESCRIPTION

In the following description, numerous specific details are set forth regarding the systems and methods of the disclosed subject matter and the environment in which such systems and methods may operate, etc., in order to provide a thorough understanding of the disclosed subject matter. It will be apparent to one skilled in the art, however, that the disclosed subject matter may be practiced without such specific details, and that certain features, which are well known in the art, are not described in detail in order to avoid complication of the disclosed subject matter. In addition, it will be understood that the examples provided below are exemplary, and that it is contemplated that there are other systems and methods that are within the scope of the disclosed subject matter.

As machine vision systems become popular in various applications, it is often desirable for machine vision systems to be used and programmed even by users without programming expertise. Therefore, it is desirable to provide a program development environment for machine vision systems that is suited to a large spectrum of users.

One such exemplary program development environment is a visual program development (VPD) environment. A VPD environment allows a user to develop portions of a computer program, or even an entire computer program, by manipulating visual elements graphically, rather than by specifying them textually.

A visual program, developed by a VPD environment, can graphically represent a dataflow by using various nodes and interconnections between those nodes. The nodes can be represented by boxes and/or other shapes in the visual program. The interconnections can be represented by lines in the visual program. Each node can represent, for example, an element of the machine vision system (e.g., a camera) or an operation performed by the machine visions system (e.g., an acquire action).

Figure 2:
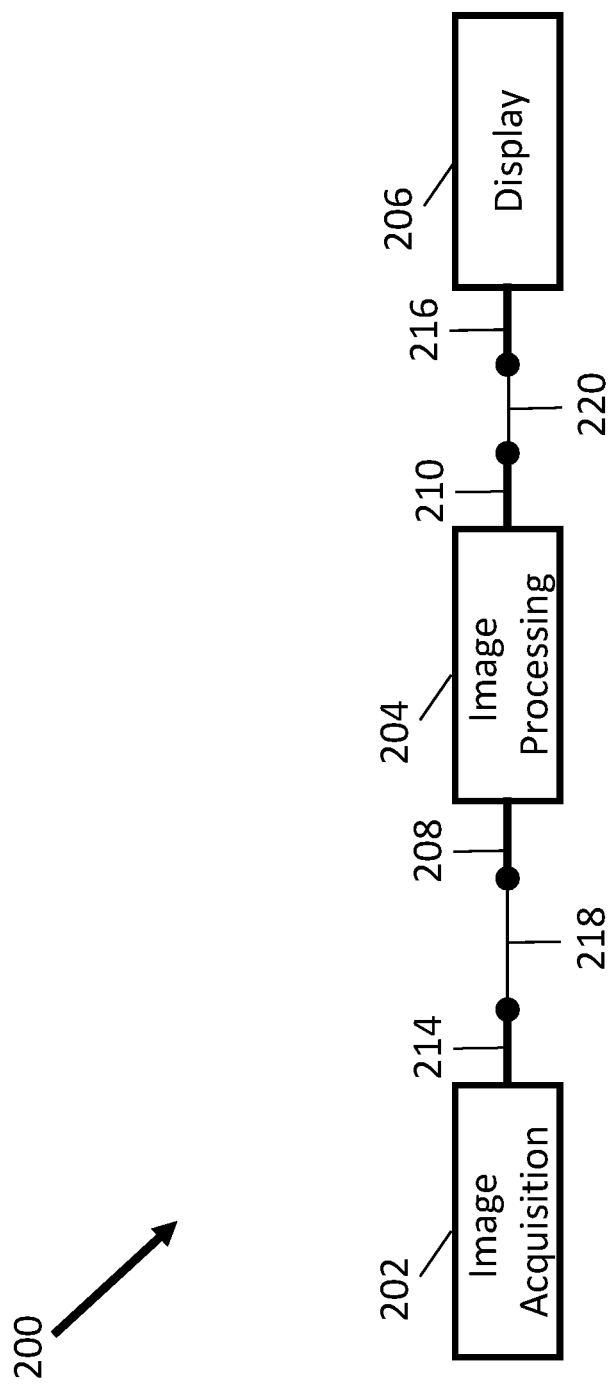
FIG. 2 shows an exemplary visual program developed in a graphical environment, in accordance with some embodiments.
Figure 3:
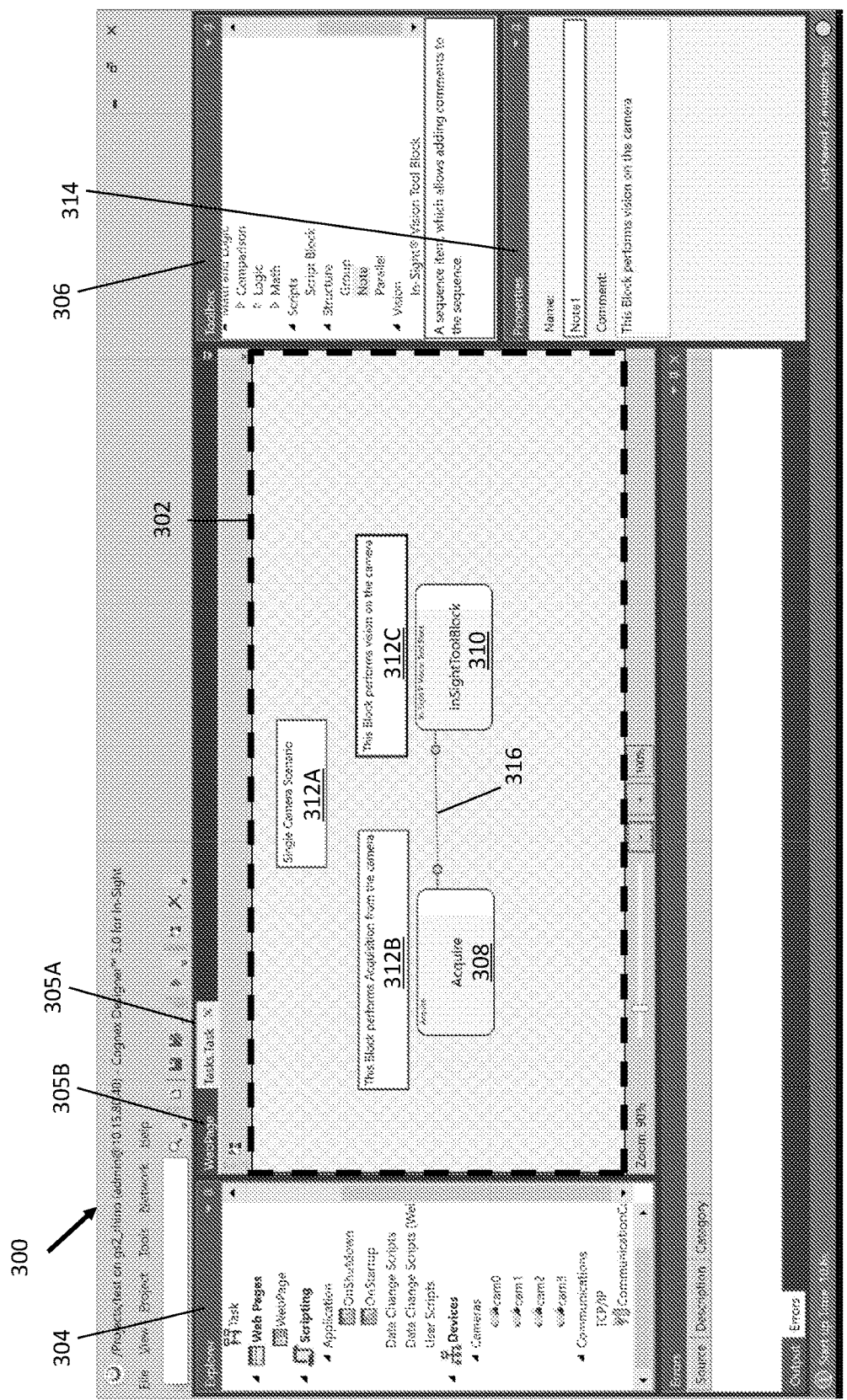
FIG. 3 shows an exemplary graphical interface for programming a visual program, in accordance with some embodiments.

The visual program can configure inputs and outputs for each node. For example, each node can include one or more input terminals to configure data input(s) to the node, and/or one or more output terminals to configure data output(s) from the node. The inputs and outputs can be represented graphically in the visual program, such as by using visual objects extending from a side of the node (e.g., such as a small circle connected to the node by a small line, as shown in FIGS. 2 and 3).

The interconnections can be used to connect inputs and outputs of the various nodes of the graphical program to build the graphical program, indicating a data flow between nodes. For example, an output terminal of a first node can be connected to an input terminal of a second node via a first interconnection to configure the program so that the second node receives (as input) the output data from the output terminal of the first node. Similarly, an output terminal of the second node can be connected to an input terminal of a third node via a second interconnection to configure the graphical program such that the second node provides data to the input terminal of the third node.

A user may assemble a visual program by placing one or more nodes into the VPD environment and connecting the one or more nodes using interconnections. For example, if a user wants to perform an addition of two numbers, the user can select a node corresponding to an addition operation and place the node into the VPD environment. The "addition" node can have two input terminals configured to receive the two numbers that should be added at the "addition node" (also known as operands) and one output terminal to provide the result of the addition operation. Therefore, the user can provide, using the interconnections, the two numbers to the input terminals of the "addition node" to perform the addition. The output terminal will contain the result of the addition. A user can use the output of the "addition node" to further process the result of the addition in the graphical program.

One potential weakness of a VPD environment is that when needing to design complex applications—such as a machine vision application—the gamut of operations that can be performed by the nodes can be limited. For example, the VPD environment may only be configured to provide a limited set of node types dedicated to a limited variety of operations, such as additions, subtractions, and multiplications. Therefore, situations can occur when a user desires to perform a particular operation but the operation is not offered by the VPD environment. Therefore, the flexibility and customizability of the programs developed in the VPD environment can be unintentionally limited.

Some VPD environments attempt to improve the flexibility by providing a node representing a custom text program. For example, a node, sometimes referred to as a "script" node, can be associated with a script program that is designed to perform a specific operation. Therefore, when a user wants to deploy a node that can perform a particular operation that is not provided by the VPD environment, the user can develop an actual software (or script) program for that particular operation, and associate the script program with a script node so that the particular custom operation can be performed by the script node.

Unfortunately, most novice users fail to leverage the flexibility provided by a script node because the use of a script node requires the ability to write the script program. In some sense, the use of a script node defeats the purpose of the VPD environment because the purpose of the VPD environment was to provide a program development environment in which a program can be developed even without expertise in writing programs.

The techniques described herein provide for a new programming mechanism for improving the flexibility of a VPD environment. In some embodiments, the VPD environment can include a spreadsheet node. As described further herein, a spreadsheet node can be associated with a spreadsheet that includes one or more cells that are configured to execute various operations. For example, a spreadsheet node can be used to specify a particular way in which an input image is processed; as another example, a spreadsheet node can be used to specify a particular way in which an input matrix is manipulated to create an output matrix.

A benefit of using a spreadsheet node, as opposed to a script node, is that a spreadsheet associated with a spreadsheet node can be programmed easily. For example, a user can use a spreadsheet program to build a spreadsheet designed to carry out a particular function. The spreadsheet program for the spreadsheet node can be designed, as described herein, so that it is easy to learn and simple to manipulate so that even novice computer users can easily program the spreadsheet. Furthermore, a spreadsheet program can provide built-in functions that can be easily combined or instantiated to carry out a desired operation in the spreadsheet. Thus, compared to a script node that often requires significant programming expertise, a spreadsheet node can strike a better balance between the flexibility of the node and the easy usage or accessibility of the node.

Figure 1:
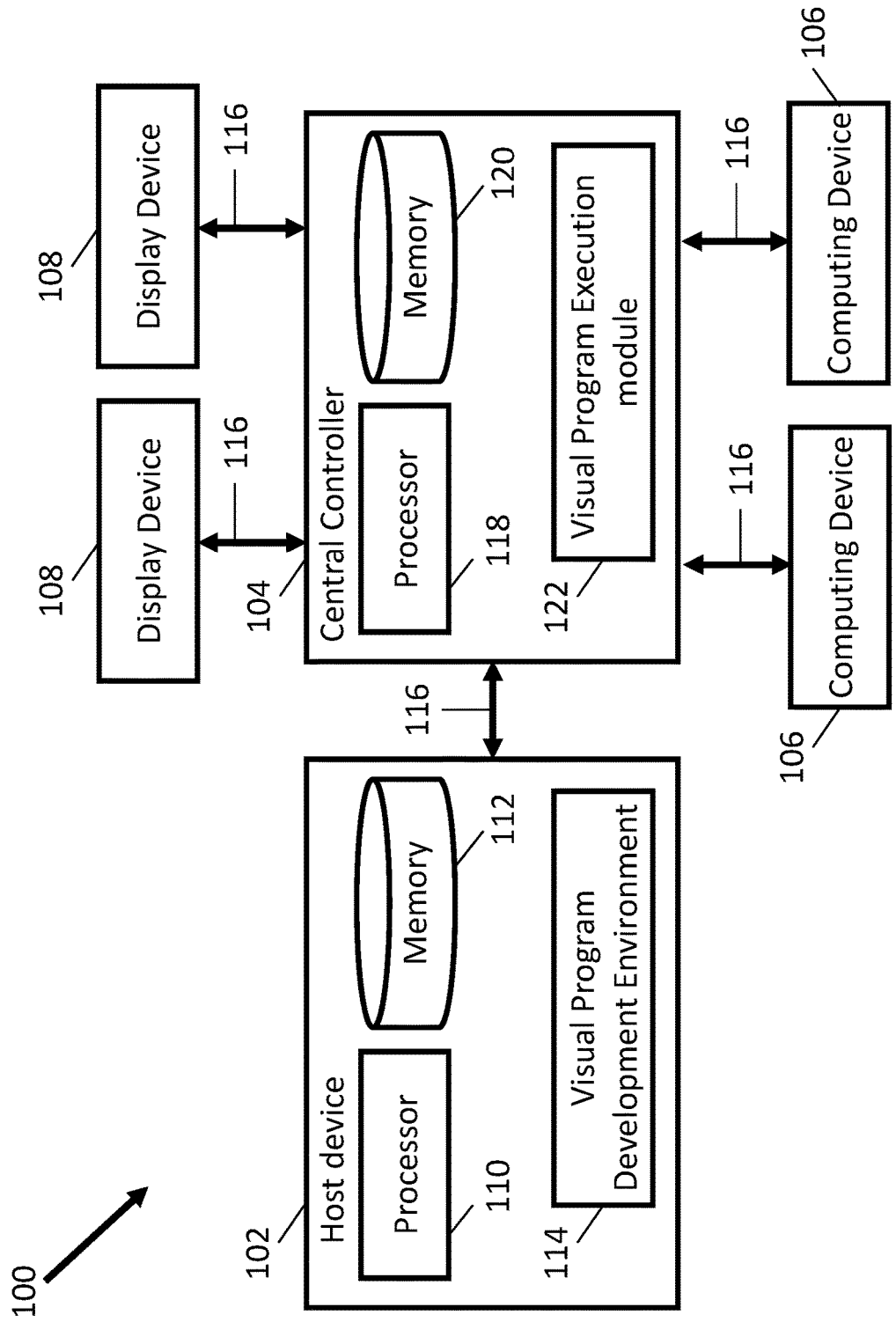
FIG. 1 shows an exemplary visual program development environment for a machine vision system, in accordance with some embodiments.

FIG. 1 illustrates an exemplary computing system that enables the use of a VPD environment in accordance with some embodiments. The system 100 can include a host device 102, a central controller 104, one or more computing devices 106, and one or more display devices 108.

In some embodiments, the host device 102 can include a processor 110, a memory device 112, and a visual program development (VPD) environment module 114. The processor 104 can execute instructions and one or more memory devices 106 can store instructions and/or data. The memory device 106 can be a non-transitory computer readable medium, such as a dynamic random access memory (DRAM), a static random access memory (SRAM), flash memory, a magnetic disk drive, an optical drive, a programmable read-only memory (PROM), a read-only memory (ROM), or any other memory or combination of memories. The memory device 106 can be used to temporarily store data. The memory device 106 can also be used for long-term data storage. The processor 104 and the memory device 106 can be supplemented by and/or incorporated into special purpose logic circuitry.

The VPD environment module 114 can be configured to provide a graphical environment in which a user can develop a visual program, as described further herein. Therefore, a user can use the graphical environment of the VPD environment module 114 to develop a visual program for the computing system 100. Once the user defines the visual program, the visual program can be launched in the computing system 100. For example, the VPD environment module 114 can package the visual program as a project file, and provide the project file to the central controller 104 via an interface 116 so that the central controller 104 can launch or execute the visual program in the project file.

In some embodiments, the central controller 104 can include a processor 118, a memory device 120, and a visual program execution (VPE) module 122. The VPE module 122 can be configured to "un-pack" the project file to retrieve the visual program, and prepare the visual program for execution. To this end, the VPD module 122 can retrieve pre-existing machine readable programs as defined in the visual program, as described further below. Depending on the definition of the visual program, the central controller 104 can assign one or more operations to one or more computing devices 106. The computing devices 106 can be, for example, cameras and/or smart cameras. A smart camera can include, for example, a processor and a memory such that the smart camera can be configured to execute one or more portions of the program designed using the VPD environment 114. Also, depending on the definition of the visual program, the central controller 104 can cause one or more display devices 108 to display data. In some embodiments, the central controller 104 can be a part of the host device 102. For example, the VPE module 122 can be a part of the host device 102.

In some embodiments, the interface 116 can be implemented in hardware to send and receive signals in a variety of mediums, such as optical, copper, and/or wireless interfaces, and in a number of different protocols, some of which may be non-transient.

In some embodiments, the VPD environment module 114 and the VPE module 112 can be implemented in software. The software can run on a processor 104 or a processor 118 capable of executing computer instructions or computer code. The processor 104 and the processor 118 can be implemented in hardware using an application specific integrated circuit (ASIC), programmable logic array (PLA), digital signal processor (DSP), field programmable gate array (FPGA), or any other integrated circuit. The processor 104 and the processor 118 suitable for the execution of a computer program include, by way of example, both general and special purpose microprocessors, digital signal processors, and any one or more processors of any kind of digital computer. Generally, the processor 104 and the processor 118 receive instructions and data from a read-only memory or a random access memory or both.

The VPD environment module 114 and the VPE module 112 can be implemented in digital electronic circuitry, or in computer hardware, firmware, software, or in combinations of them. The implementation can be as a computer program product, e.g., a computer program tangibly embodied in a machine-readable storage device, for execution by, or to control the operation of, a data processing apparatus, e.g., a programmable processor, a computer, and/or multiple computers. A computer program can be written in any form of computer or programming language, including source code, compiled code, interpreted code and/or machine code, and the computer program can be deployed in any form, including as a stand-alone program or as a subroutine, element, or other unit suitable for use in a computing environment. A computer program can be deployed to be executed on one computer or on multiple computers at one or more sites.

FIG. 2 illustrates an exemplary visual program 200 developed in a graphical environment of the VPD environment module 114, in accordance with some embodiments. As explained herein, a visual program can include one or more nodes that are connected by one or more interconnections. The exemplary visual program 200 shown in FIG. 2 includes three nodes: image acquisition node 202, image processing node 204, and display node 206. As explained herein, each node can include one or more input terminals for receiving data and one or more output terminals for outputting data. For example, the image processing node 204 includes one input terminal 208 and one output terminal 210.

A node may not have any input terminals. For example, the image acquisition node 202 only has an output terminal 214, e.g., because the data processed by the image acquisition node 202 can be internally defined by the node itself rather than by one or more inputs. For example, the image acquisition node 202 can acquire an image using a camera, or the image acquisition node 202 can retrieve data from a memory device. Likewise, a node may not have any output terminals. For example, the display node 206 only has an input terminal 216. In this case, for example, the data manipulated by the display node 206 can be displayed on a display device and/or stored in a memory device. For example, the display node 206 can cause the data received at the input terminal 216 to be display on a display device, such as the display device 108 in FIG. 1. The nodes can be connected by interconnection, for example, the interconnections 218, 220, to identify a data flow between the nodes.

In some embodiments, the visual program is executed in accordance with the data flow identified by the nodes and interconnections. For example, when the image acquisition node 202 receives or creates data (e.g., through a process internally defined in the node 202, such as capturing an image via a camera or a smart camera), the image acquisition node 202 can process the data and provide a first output data to an output terminal 214. The output terminal 214 then provides the first output data, through the interconnection 218, to the input terminal of another node, such as the input terminal 210 of the image processing node 204. The image processing node 204 can process the first output data received at the input terminal 210 (e.g., a captured image) to generate a second output data (e.g., processed image data). The image processing node 204 can subsequently provide the second output data to the output terminal 212, which is subsequently received by the input terminal 216 of the display node 206. Since the functionality of the visual program is defined by the functionality of nodes and the interconnections between the nodes, the visual program can visually convey the functionality of the program as it is developed.

FIG. 2 shows a simple example of a visual program. One of skill in the art will appreciate that the visual programs can be much more complex than that shown in FIG. 2, such that they include a large number of nodes and interconnects. Additionally, other aspects of the visual program can be configured, such as whether one or more nodes are to run in parallel with other nodes, if nodes are to execute sequentially (e.g., from left to right as designed in the visual program), and/or the like. For example, in some embodiments, the transfer of data between nodes can be asynchronous: a node can transfer data to another node at any time (e.g., once the data is available). In other embodiments, the transfer of data between nodes can be synchronous. For example, a node can transfer data to another node at a predetermined instance of a clock cycle.

FIG. 3 illustrates an exemplary graphical interface of the VPD environment module for programming a visual program, in accordance with some embodiments. The graphical interface 300 can include a program panel 302 in which a user designs the graphical program by instantiating various node(s) and/or interconnection(s). The graphical interface 300 can also include an explorer selection bar 304 with a tree for selecting devices and/or features for the visual program, including the sub-systems in the VPD environment. Such components in the explorer section bar 304 include scripting blocks (e.g., blocks that allow the user to create custom scripts), hardware devices (e.g., cameras, smart cameras), recipes (e.g., stores a collection of tag data that can be loaded to customize an application for inspecting similar parts with varying requirements), a Tag Manager (e.g., a collection of unique global custom values used to share data among all the sub-systems in the application at run-time), Tasks (e.g., a graphical representation of the sequence of interconnected blocks), and Web Pages (e.g., to develop a user interface). For example, the Devices component in the explorer selection bar 304 shows what hardware devices are currently available. For example, the Devices component can display which cameras are physically connected to the system, and whether the input/output (IO) hardware is recognized and up and running. The Devices component can also provide access to communication devices, like TCP/IP, Discrete IO, and/or the like.

The VPD can be configured such that when a user selects an element from the explorer section, the VPD environment will change to correspond with what that sub-system has to offer. Users can select an item in the explorer selection bar 304 and right click in the program panel 302 to create a corresponding block in the graphical program. For example, a user can click on the a Task in the explorer selection bar 304 and right-click in the program panel 302 to create a new Task block for the graphical program. When the VPD environment creates a new Task block, the toolbox 306 will change to tools appropriate for the newly created Task. As another example, a user can select the Web Pages in the explorer selection bar 304 and right click in the program panel 302 to create a new Page block for the graphical program. This will change the toolbox 306 to show tools that are appropriate for a web page.

In some examples, for some components and/or devices in the explorer selection bar 304, a user can double click on a component to modify associated properties of the component. For example, if a user selects "camera 0," the user can double click on it to configure any of the acquisition properties. In some embodiments, if the user double-clicks on an item in the explorer selection bar 304, it will bring the user to a corresponding tab 305 in the editor to allow the user to edit the selected item.

The graphical interface 300 can also include a toolbox 306 with a graphical tree for selecting one or more nodes and/or structures for the program panel 302. In some embodiments, the toolbox 306 is populated with the appropriate tools given what component or sub-system is currently being edited in the program panel 302. For example, if a user is editing a Task (e.g., as shown in FIG. 3 by tab 305) then the toolbox 306 is populated with tools that are appropriate to be placed into a Task sequence diagram for the graphical program. If a user is editing a web page (e.g., by selecting the WebPage tab 305B), then the toolbox 306 is populated with controls that can be dropped into a web page for creating a custom HMI.

For example, as shown in FIG. 3 the nodes can include the acquire node 308 and the In-Sight Vision Tool Block node 310, which can be selected for addition to the program panel 302 using the toolbox 306. The program panel 302 also includes an interconnect 316 between the output of the acquire node 308 and the input of the InSightToolBlock 310. Additionally, the toolbox 306 can allow the user to perform other functions, such as adding notes. The program panel 302 includes three notes: note 312A indicates that the visual program is for a single camera scenario; note 312B indicates that the acquire node 308 (or block) performs data acquisition from the camera; and note 312C indicates that the InSightToolBlock node 310 (or block) performs vision on the camera (e.g., is running the various vision algorithms against the acquired or input image). An InSightToolBlock is, for example, a node that represents an executing spreadsheet. It can have input terminals which are connected to input cells and it can have output cells that are connected to output terminals, as explained in further detail herein.

As another example, the toolbox 306 allows a user to select a Parallel Block. In some embodiments, any blocks in the program panel 302 that are inside of the Parallel Block will cause the inside Blocks to be executed in parallel to one another. Without a parallel block, in some embodiments the blocks in a Task Sequence diagram are executed serially from left to right. So, the parallel block can be used to improve the performance of the system by causing blocks to run at the same time in different threads. For example, using a parallel bloc can result in the overall Task Sequence from completing faster.

The graphical program interface 300 can also include a properties panel 314 for modifying properties of an object selected in the program panel 302. In FIG. 3, the note 312C is selected, as indicated by the darker outline around the note 312C compared to the outlines of the remaining objects in the program panel 302. By selecting the note 312C, the graphical interface allows the user to modify the properties of the note 312C, namely setting the comment to "This Block performs vision on the camera." The graphical interface 300 can therefore enable a user to add, configure and modify a number of nodes and interconnections between the nodes to create the visual program.

In some embodiments, the graphical interface 300 can enable a user to specify a computing device for executing an operation associate with a node. For example, when a user selects a node, the user can be provided with a property pane in which a user can specify the computing device for executing that particular selected node.

In some embodiments, the graphical interface 300 can provide a spreadsheet node. A spreadsheet node is a node that is associated with a spreadsheet, such that the node is configured to perform one or more operation(s) as defined in the spreadsheet. Thus, a spreadsheet node can be used to incorporate a spreadsheet functionality into a graphical programming environment. The specific operation of the spreadsheet can be defined by a user using a spreadsheet interface that is displayed to the user. U.S. Pat. No. 7,107, 519, issued on Sep. 12, 2006, entitled titled "Spread-Sheet Based User Interface Creation," assigned to Cognex Corporation, describes an exemplary spreadsheet interface for programming a spreadsheet, which is incorporated by reference herein in its entirety.

The spreadsheet interface associated with the spreadsheet node can display the rows and columns of cells for the spreadsheet. The content of a cell can be specified by a user during an options specifying process, and may include, for example, the addition or specification of functions, mathematical expressions, data labels, and/or data to be processed according to the desired operation. In addition, input and/or output functions can be placed in cells, e.g., where input functions read information from hardware devices and output functions interact with specialized hardware devices. Together, the cell expressions in a spreadsheet define the portions of the visual program associated with the spreadsheet node. Because of the flexibility of the spreadsheet program, the spreadsheet interface can be used to specify and/or develop custom features for the machine vision system that are not otherwise offered by the graphical programming environment.

Figure 4:
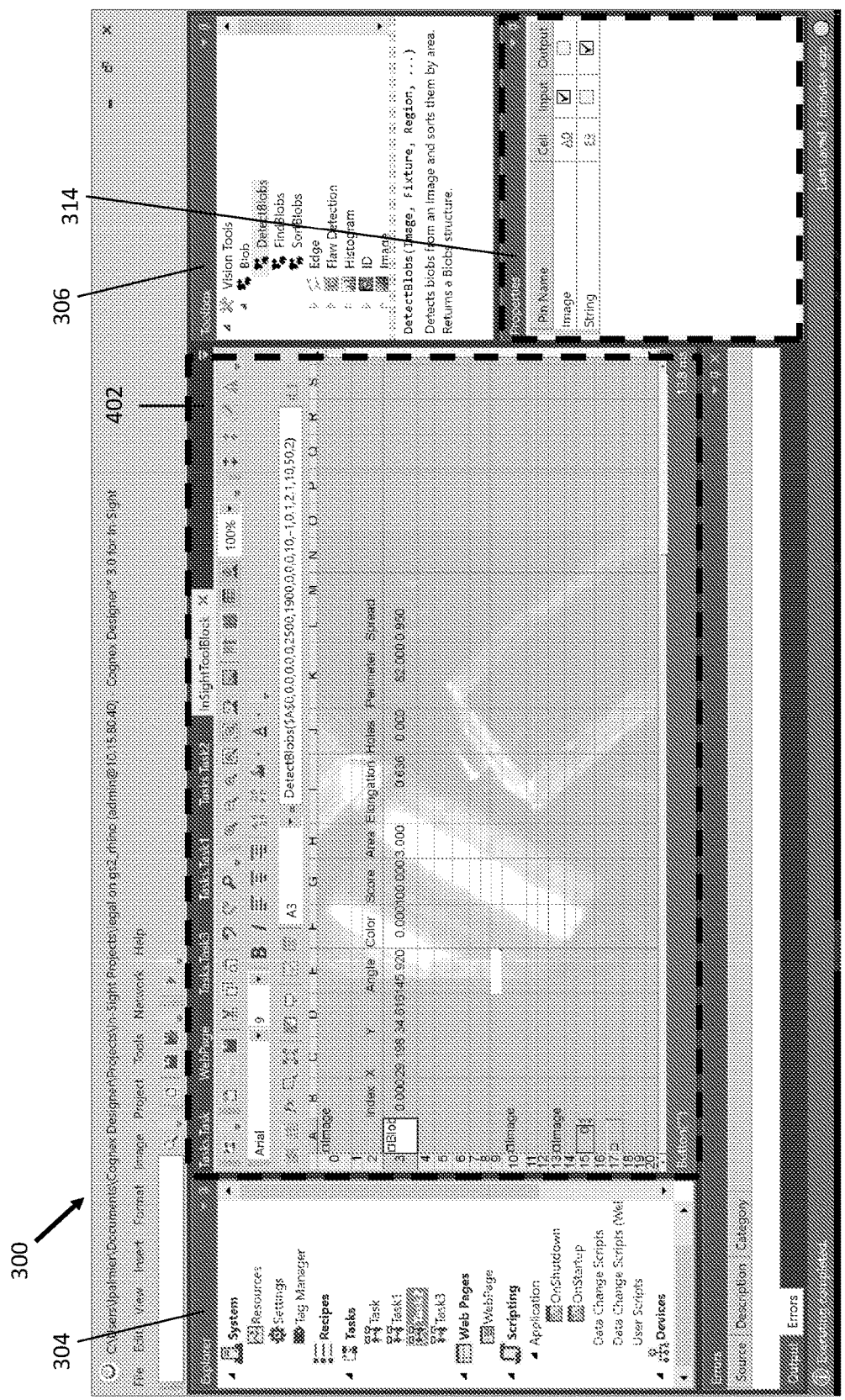
FIG. 4 shows a spreadsheet interface shown in the graphical interface, in accordance with some embodiments.

In some embodiments, when a user selects a spreadsheet node (e.g., a user double-clicks on a spreadsheet node, such as the InSightToolBlock 310 from FIG. 3), the graphical interface of the VPD environment module 114 can provide a spreadsheet interface. FIG. 4 illustrates an example of a spreadsheet interface 402 shown in the graphical interface 300 of the VPD environment module 114, in accordance with some embodiments. As shown, the spreadsheet interface 402 can include a plurality of cells arranged in rows and columns. FIG. 4 shows columns A through S and rows 0 through 20.

As will be described further herein, the spreadsheet interface 402 can allow a user to configure input(s) and output(s) for the associated node in the VPD environment. For example, any cell in the spreadsheet can be configured as an input or an output for the associated node in the program panel 302. For example, a user can configure the spreadsheet to specify any cell as its Input Image, which the user can process further in the spreadsheet (e.g., by defining or using one or more functions in the spreadsheet). The spreadsheet can allow multiple inputs and/or multiple outputs. Additionally, as further described herein, the spreadsheet can be configured to publish the value of any cell (e.g., a value set by processing and/or functions in the spreadsheet) to a HMI to easily allow binding of HMI controls to cells in a spreadsheet.

The spreadsheet interface can be pre-configured with predetermined functions to aid programming of the spreadsheet. For example, the spreadsheet interface can include the programming functionalities described in U.S. Pat. No. 9,123,093, issued on Sep. 1, 2015, entitled "Vision inspection programming method and apparatus," assigned to Cognex Corp, which is incorporated by reference herein in its entirety. The toolbox 306 of the graphical interface 300 can be configured to allow a user to select one or more pre-defined functions for a particular cell of the spreadsheet interface 402. For example, as shown in FIG. 4, cell 3A includes a DetectBlobs function from the toolbox 306 which, as explained in the comment section of the toolbox 306, detects blobs from an image and sorts them by area, returning a blob structure. The user can configure the inputs and outputs of the DetectBlobs function by identifying cells in the spreadsheet interface 402. As another example, the spreadsheet interface can allow a user to add a script (e.g., JavaScript code) to a cell, such that the script is executed when the spreadsheet executes, as described further herein.

In some embodiments, an input terminal of a spreadsheet node can be used to provide a cell content to the cell associated with that input terminal. For example, in FIG. 4, when data is received by the spreadsheet node at the input terminal, the received data is provided as the content of the cell A0 associated with that input terminal. The spreadsheet can use the content of the cell A0 to process the data using the operation specified in the spreadsheet. For example, functions and operations can be added to the spreadsheet that use A0 as a parameter.

In some embodiments, an output terminal of a spreadsheet node can be used to retrieve a cell content from the spreadsheet to be used by other nodes in the visual program. For example, in FIG. 4, when a spreadsheet provides an output of an operation to a cell associated with the output terminal, the spreadsheet node provides that output to the output terminal so that other nodes connected to the output terminal of the spreadsheet node can use that output.

In some embodiments, a single spreadsheet can include one or more cells designated as input terminals and/or one or more cells designated as output terminals for the spreadsheet node. For example, a user can add entries for inputs and/or outputs to the properties panel 314 by right-clicking on a cell in 402. By designating the cell, the VPD environment can, for example, bring up a pop-up context menu that allows the user to select a menu item to specify the cell as either an input or an output. In some embodiments, if a cell is designed as input or output to the spreadsheet, the associated cell will get an adornment (e.g., in the lower right corner of the cell box, such as a small shading as shown in the table for cells A0 and E9), and the properties panel 314 will be automatically updated with a pin name and associated information for the pin (e.g., the input or output).

The program panel can display the one or more input terminals and one or more output terminals for the spreadsheet node. For example, the properties panel 314 shows the list of inputs and outputs for the spreadsheet. The image at cell A0 is defined as an input to the spreadsheet, and the output of one or more functions created in the spreadsheet interface 402 is populated into the spreadsheet at cell E9 as a string data type. Subsequent nodes added to the graphical program can use the output at E9 by graphically linking to the output of the spreadsheet node (which will be the value populated to cell E9 during runtime). The ability to define the input(s) and/or output(s) of a particular spreadsheet node via the cells of the spreadsheet creates the linkage between the spreadsheet and the graphical programming environment.

The data types for the input(s) and/or output(s) can be pre-defined by the graphical programming environment. In some examples, the graphical programming environment can allow simple data objects to be used as inputs and outputs, such as digital images, string data types, integer data types, double data types, and/or the like. In some examples, the graphical programming environment can support complex data types, such as a composite of primitive data types that are organized in some fashion. Complex data types could include, for example, lists of (x,y) data points, calibration information (e.g., matrix information, non-linear data), and/or the like.

Figure 5:
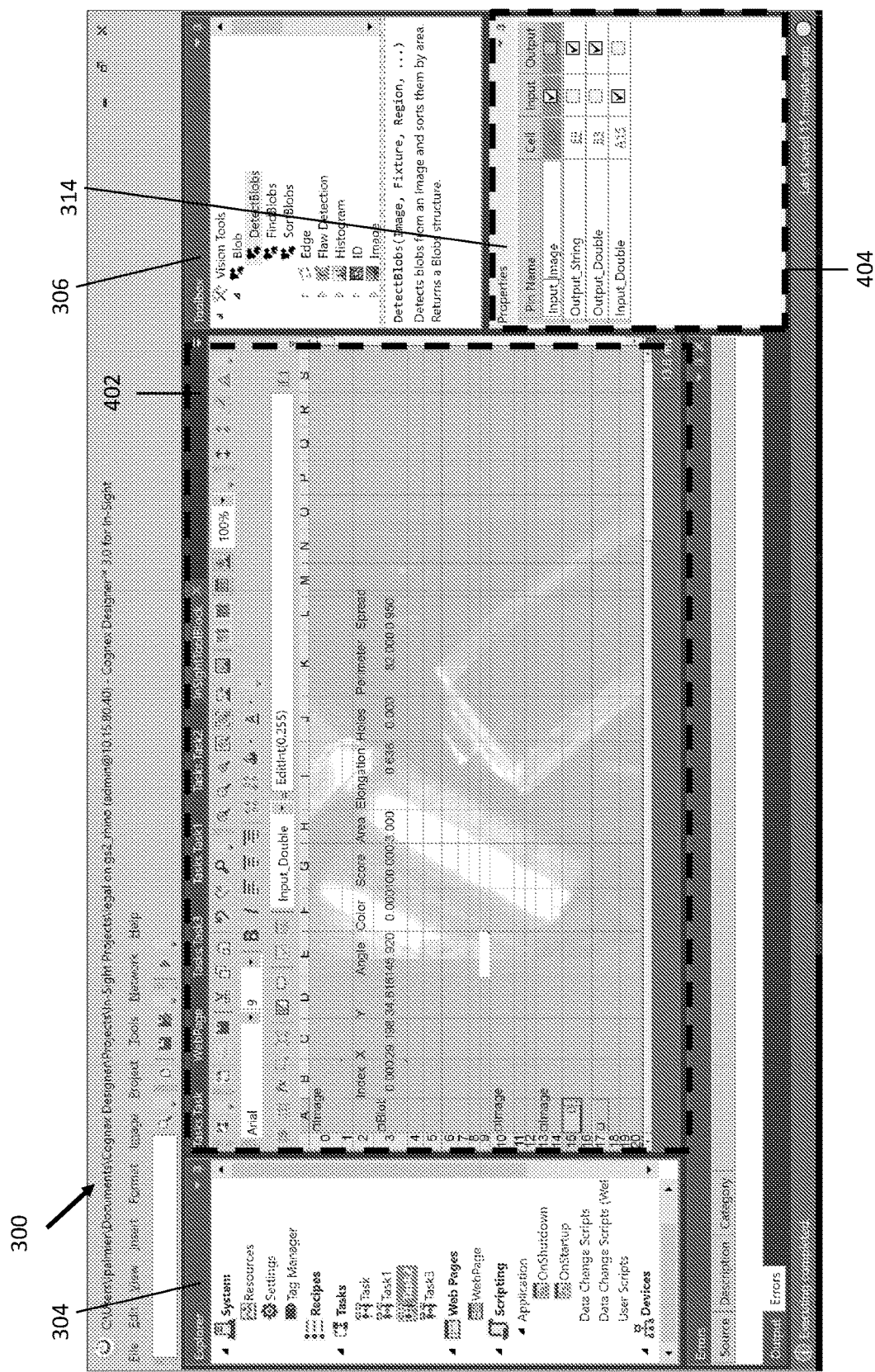
FIG. 5 shows a spreadsheet interface shown in the graphical interface, in accordance with some embodiments.

While FIG. 4 shows only one input and output, FIG. 5 illustrates a spreadsheet node that includes two input terminals and two output terminals, in accordance with some embodiments. As shown in the properties panel 314, the spreadsheet includes two inputs: (1) cell A0, which corresponds to an image that is an input to the spreadsheet, and (2) cell A15, which corresponds to a double integer data type that is an input to the spreadsheet. The spreadsheet also includes two outputs: (1) a string data type that is mapped to cell E9 for output, and (2) a double data type that is mapped to cell B3 for output.

In some embodiments, the graphical interface can automatically show and/or update the input and/or output terminals attached to the spreadsheet node (e.g., in the program panel 302) based on cells identified as an input terminal or an output terminal in the spreadsheet interface. Thus, creation of the input and output pins can be done through the spreadsheet interface 402 by designating a cell as an input or an output. Once created through the spreadsheet interface 402, the visual programming development environment can automatically update the display to show input and output pins in the program panel 302. For example, suppose a user configures a spreadsheet associated with a spreadsheet node to have one input terminal and one output terminal (e.g., as defined in the property pane 404 of FIG. 4). When a user returns to the program panel 302, the program panel 302 can graphically show one input terminal and one output terminal coupled to the spreadsheet node (e.g., when otherwise the program panel 302 may show no inputs or outputs prior to configuration).

Figure 9:
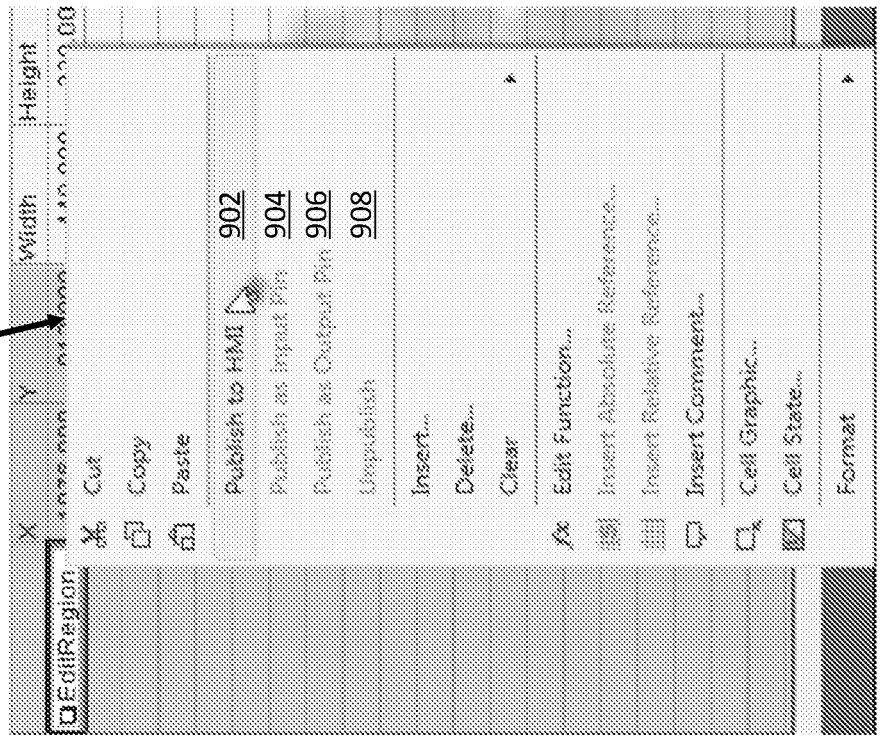
FIG. 9 shows an exemplary menu for publishing an input and/or an output of a spreadsheet, according to some embodiments.

The spreadsheet interface 402 can provide various techniques for inserting inputs and outputs. For example, a right-click menu can be provided to allow a user to publish input pins and/or output pins. FIG. 9 shows an exemplary menu 900 for publishing an input and/or an output of a spreadsheet, according to some embodiments. A user can invoke the menu 900 by right-clicking on a cell in the spreadsheet interface. The menu 900 includes a number of options for a particular cell in the spreadsheet interface to set the cell as an input pin or an output pin, and/or to manipulate the cell. Option Publish to HMI 902 can be selected to publish the cell to an HMI (e.g., to have the value of a cell displayed in an HMI, as explained further herein). Option Publish as Input Pin 904 can be selected to publish the cell as an input pin (e.g., to display an input pin on the corresponding block in the block diagram that is associated with the cell). Option Publish as Output Pin 906 can be selected to publish the cell as an output pin (e.g., to display an output pin on the corresponding block in the block diagram that is associated with the cell). Option Unpublish 908 can be selected to unpublish the cell (e.g., to remove a pin displayed on the block).

Each cell in the spreadsheet interface 402 can include one or more properties, such as for name, input, and output (e.g., as shown by the properties panel 314). In some embodiments, when the user publishes a cell as either an input or an output, the program chooses a default name for a pin based on the cell properties and updates the cell's properties in the camera. A "changed" event signals both the properties panel 314 and the corresponding block in the program panel 302 to update, if necessary. For example, if the program determines that the block is a new input or output cell, the program publishes a corresponding pin for the block in the graphical diagram in the program panel 302.

Once the VPD environment module 114 receives a visual program, the VPD environment module 114 can package the visual program as a project file and provide the project file to the central controller 116. Subsequently, the central controller 116 can unpack the visual program (e.g., traverses the file and generates objects in memory in accordance with the type specified in the file). In some embodiments, the central controller 116 generates an object for each node, and that object knows how to execute based upon the parameters of the object. For example, for the visual program defined in FIG. 2, the central controller 116 can determine the objects for each of the nodes 202, 204, 206, and schedule the objects for the nodes 202, 204, 206 to be executed sequentially, as defined in FIG. 2.

When a node in the visual program is associated with a predetermined machine readable program (e.g., the node is a script node), the central controller 116 can simply retrieve that predetermined machine readable program. When a node in the visual program is not associated with a predetermined machine readable program (e.g., the node is a spreadsheet node), the central controller 116 can organize the operation(s) defined by that node into a human readable representation of that portion of the program for execution.

For example, the human readable representation of the visual program can be created using JavaScript Object Notation (JSON), which is an open-standard format that uses human readable text. FIGS. 10A-10C show an exemplary object for a spreadsheet node, according to some embodiments. FIGS. 10A-10C show a SheetBlock object 1002. The SheetBlock includes the "SpreadsheetData" entry 1004, which includes the data contained within the spreadsheet. For illustrative purposes, the placeholder "<DATA>" was included for the "SpreadsheetData" in place of actual spreadsheet data. In some embodiments, the spreadsheet data can be stored in base64 encoded binary format). In some embodiments, the spreadsheet data (e.g., contained within the "SpreadsheetData" entry) includes cells which have names, cells associated with input flags, and/or cells associated with output flags. In some embodiments, the names of the cells in the spreadsheet data match the NamedCell objects. The SheetBlock object 1002 can also include information that specifies the inputs and outputs of the spreadsheet. For example, the NamedCell entry 1004 includes the following information: it is an image ("DataType": "Image"), and it is an input to the spreadsheet ("IsInput": true).

Figure 11:
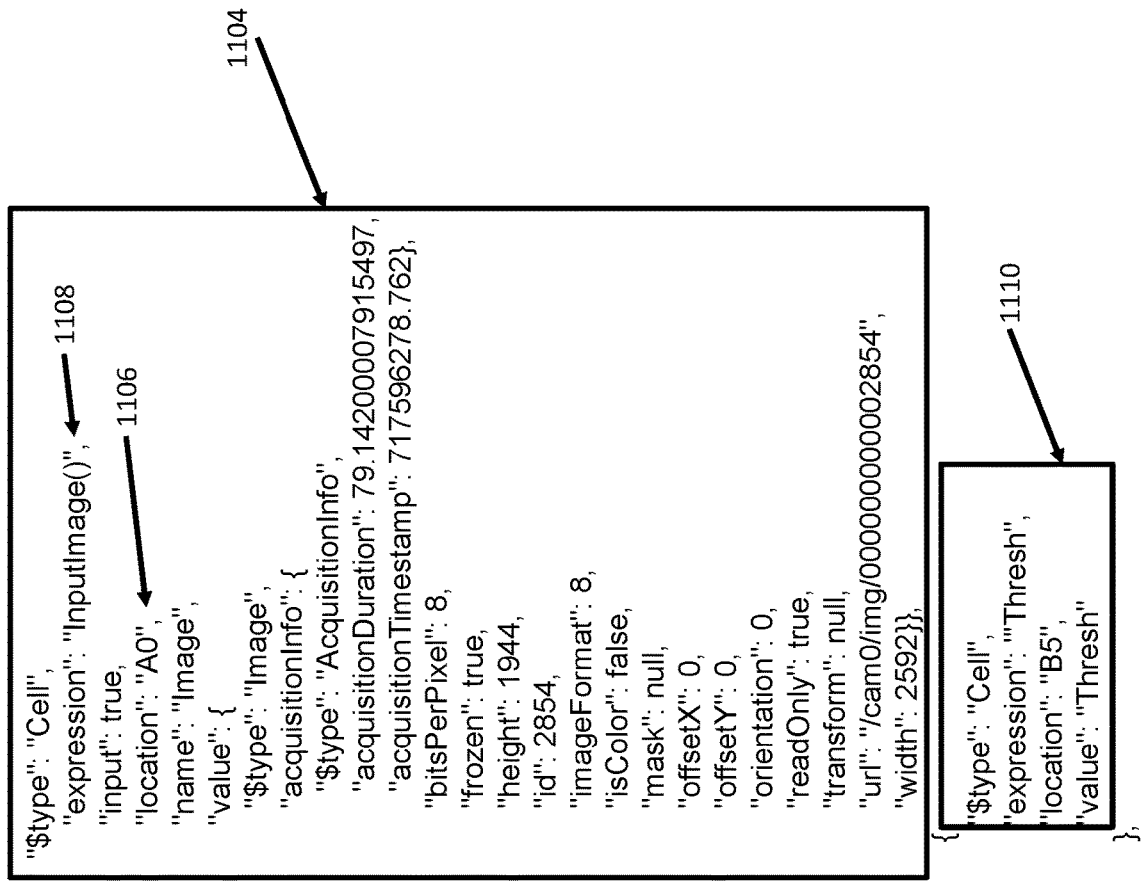
FIG. 11 is an exemplary list of objects for cells in a spreadsheet, according to some embodiments.

FIG. 11 is an exemplary list of objects for cells in a spreadsheet, according to some embodiments. The list includes a list of entries for each cell that explain the contents of the cell. In this example, the first entry 1104 shows that cell A0 of the spreadsheet (pointed to by arrow 1106) contains a function call InputImage (pointed to by arrow 1108). The second entry 1110 shows that cell B5 contains a label (shown by "expression": "Thresh"), and does not contain a function like that shown in entry 1104.

As shown in the examples in FIGS. 10A-10C and FIG. 11, the central controller has a list of nodes defined by the visual programming environment. The central controller turns each node into an object in memory. The central controller figures out which node to run based upon left to right order as they are created (or another order, if defined by the user) and then executes the objects. For example, if one of the nodes is a spreadsheet, the central controller can hand off that data to a camera for execution. As another example, if one of the nodes is a script, then the central controller can compile and execute the script.

For example, when the node is a spreadsheet node, the central controller 116 can determine the dependencies of the cells. For example, if a cell is an input, then the input needs to be processed before one or more cells can act on the input. As another example, if a cell is an output, then the cell(s) that populate the output value need to be executed before returning the output.

In some embodiments, a single spreadsheet node can be used to set up and configure a plurality of cameras (e.g., one or more, or all of which are executing remotely from the central controller). The cameras can be, for example, smart cameras that include processors and memory that allow the camera to execute the spreadsheet and/or functions defined by the spreadsheet. A user can specify the target camera(s) directly in the spreadsheet so that the user can specify the remoteness of the graphical program. The controller (e.g., the central controller 104 shown in FIG. 1, such as an embedded controller) can be configured to coordinate the execution of the spreadsheet across the set of cameras, such as, for example, passing data between the remote cameras.

In some embodiments, the programming environment generates the list of operations that need to take place for the spreadsheet, which can be used to create a dependency graph that represents all the operations and the data. For example, the controller can pass a block of information that represents a spreadsheet to a camera for execution. The camera can open up the spreadsheet and identify the dependency and order of operations it should execute. The camera can process the dependency graph to determine, for example, where the data is, where it needs to go, and what operation(s) the camera performs.

In some embodiments, the techniques described herein can use the process of serialization to create the human readable file. Serialization can include, for example, configuring the cells in the spreadsheet, configuring the input(s) for the spreadsheet, configuring the output(s) for the spreadsheet, and encapsulating the spreadsheet information to save it to a human readable project file. The host device can send that project file down to the controller (e.g., the central controller 104 shown in FIG. 1, such as an embedded controller). The central controller can be configured to coordinate execution of the spreadsheet(s) to one or more associated cameras, while the functionality defined by the other blocks of the graphical program can execute on the controller itself.

In some embodiments, the data acquired by a smart camera (e.g., the image data) can be passed back to the controller in an abbreviated form. For example, since the image data can be large, the system can be configured such that rather than copying an image from the camera to the controller, the controller can access the images via a URL that accesses images on the camera by going through the controller's network stack.

In some embodiments, when a node of a visual program is a display node, that node can be configured to display data on a display device 108. If there multiple display devices 108, the display type node can specify the particular display device 108 on which to display the data.

In some embodiments, a display node may be associated with a particular human machine interface (HMI). For example, the HMI can include a graphical interface that is designed to show data on a display device 108. In some embodiments, the HMI can be a web-based HMI. The HMI can be custom-designed by a user so that the user can specify the type of data to be displayed on the HMI and the manner in which the data is displayed on the display device 108. The techniques described herein can allow information to be passed from the spreadsheet to the HMI. For example, the host device can provide a graphical user interface builder with a tool pallet that allows a user to drag buttons/text boxes onto a canvas to graphically design a user interface (the HMI). When a particular graphical item is dragged onto the canvas, the properties for a particular graphical item can be configured to point at one or more cells of the spreadsheet. For example, the text for a text box can be configured to display the value populated into a particular spreadsheet cell during execution of the spreadsheet.

Figure 6:
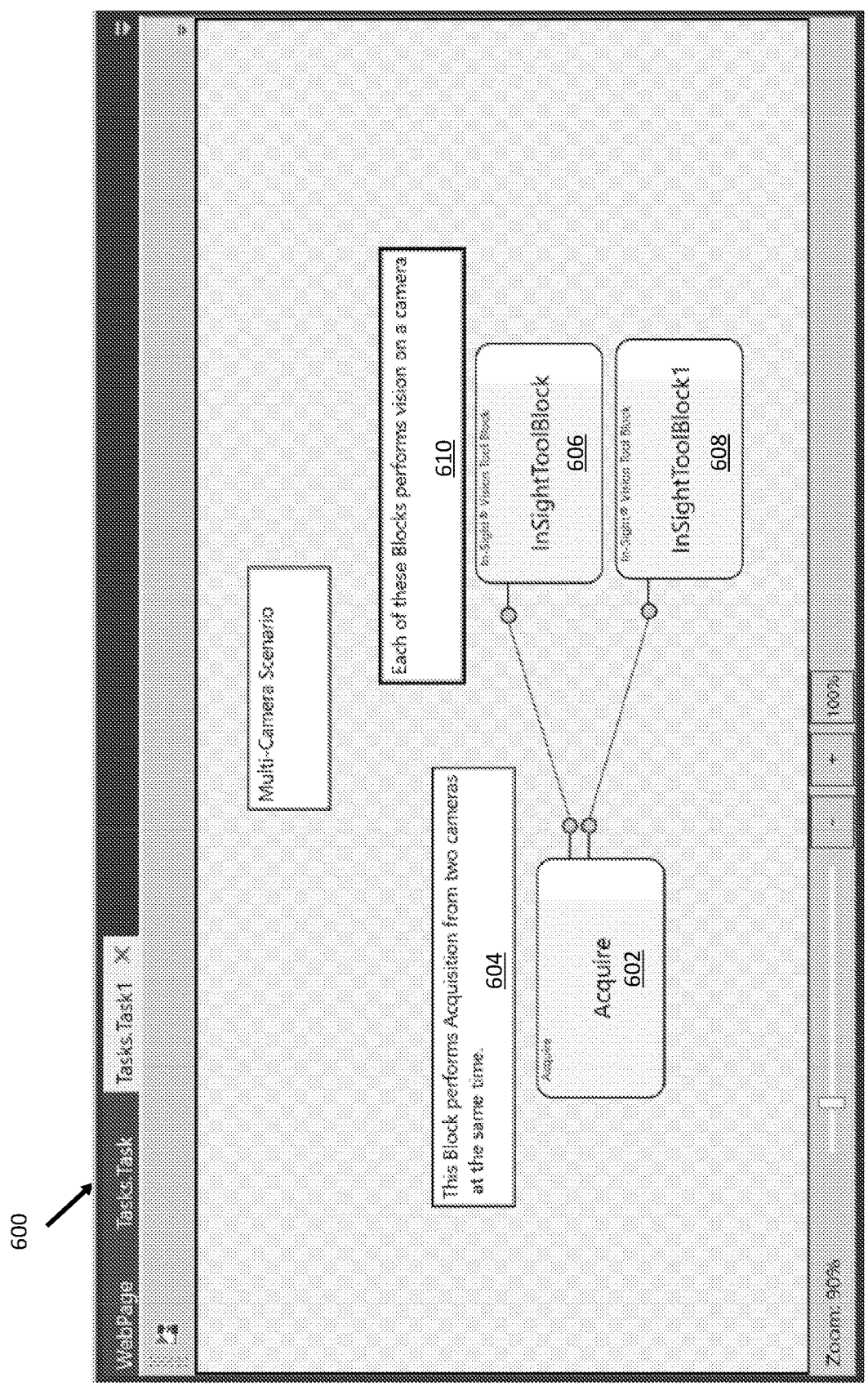
FIG. 6 shows an exemplary program panel of a graphical interface for a visual program with multiple cameras, in accordance with some embodiments.

While FIG. 3 shows an example using a single spreadsheet (associated with the InSightToolBlock 310) for a single camera (e.g., the camera that executes the Acquire node 308), the techniques described herein can use other configurations including a plurality of cameras and/or a plurality of nodes that support spreadsheets. FIG. 6 shows an exemplary program panel 600 of a graphical interface (e.g., the graphical interface 300 in FIG. 3) for a visual program with multiple cameras, in accordance with some embodiments. The program panel includes an acquire node 602 configured to perform image acquisition from two different cameras at the same time, as indicated in comment 604. The images acquired from one camera are processed by the InSightToolBlock node 606. The images acquired from the other camera are processed by the InSightToolBlock node 608. Therefore, each InSightToolBlock 606, 608 performs vision processing on data from an associated camera used by the acquire node 602, as indicated in comment 610.

Figure 7:
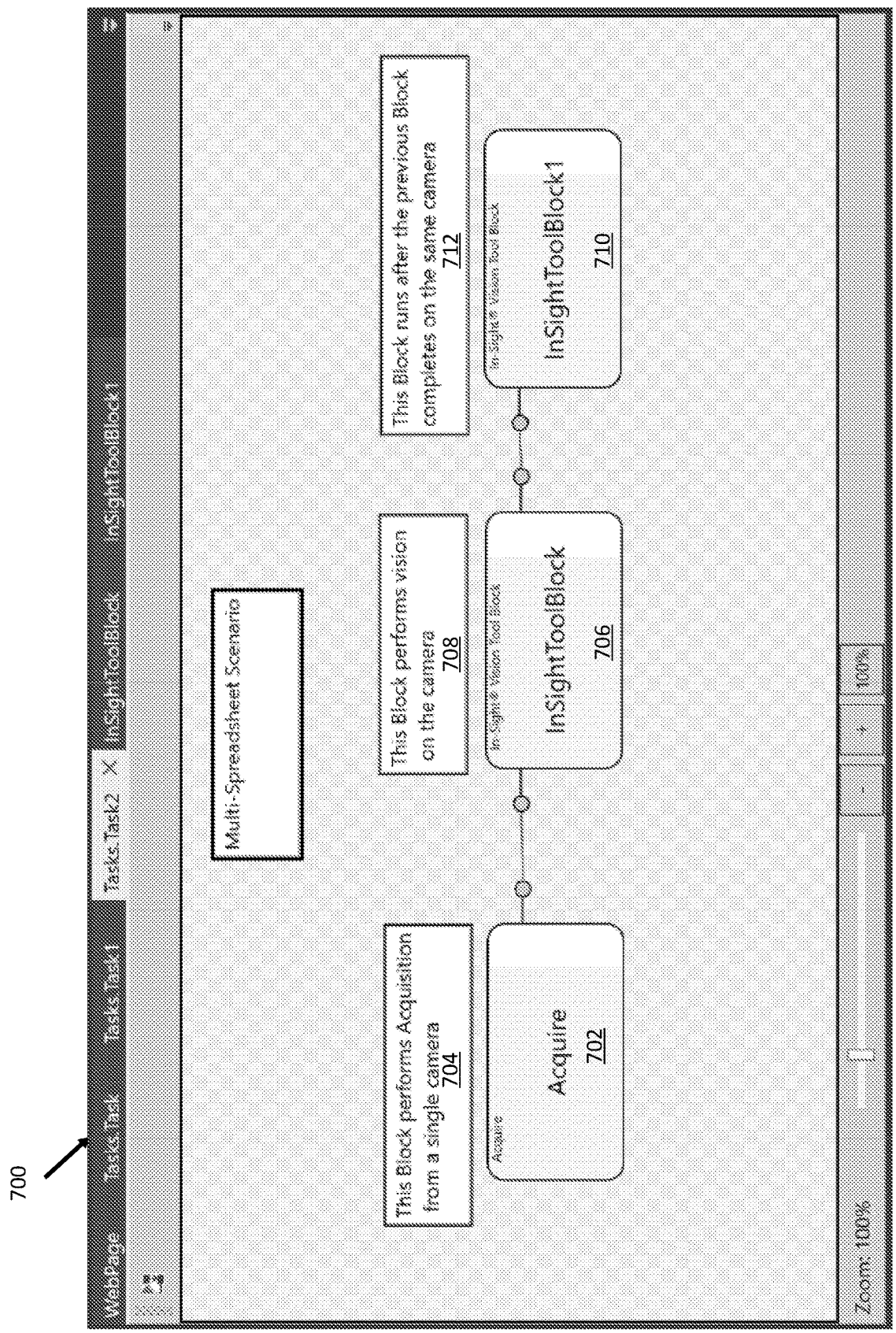
FIG. 7 shows an exemplary program panel of a graphical interface for a visual program with a single task with multiple nodes (that each use a spreadsheet) for the same camera, in accordance with some embodiments.

FIG. 7 shows an exemplary program panel 700 of a graphical interface for a visual program with a single task with multiple nodes (that each use a spreadsheet) for the same camera, in accordance with some embodiments. The acquire node 702 is configured to perform image acquisition using a single camera, as explained in the comment 704. The output of the acquire node 702 is input to the InSightToolBlock 706, which is configured to perform vision processing on the data acquired by the camera, as explained in comment 708. The output of the InSightToolBlock 706 is fed into InSightToolBlock1 710, which runs after InSightToolBlock 706, as explained in the comment 712. Each of the InSightToolBlock 706 and InSightToolBlock1 710 are configured using a different, associated spreadsheet.

Figure 8:
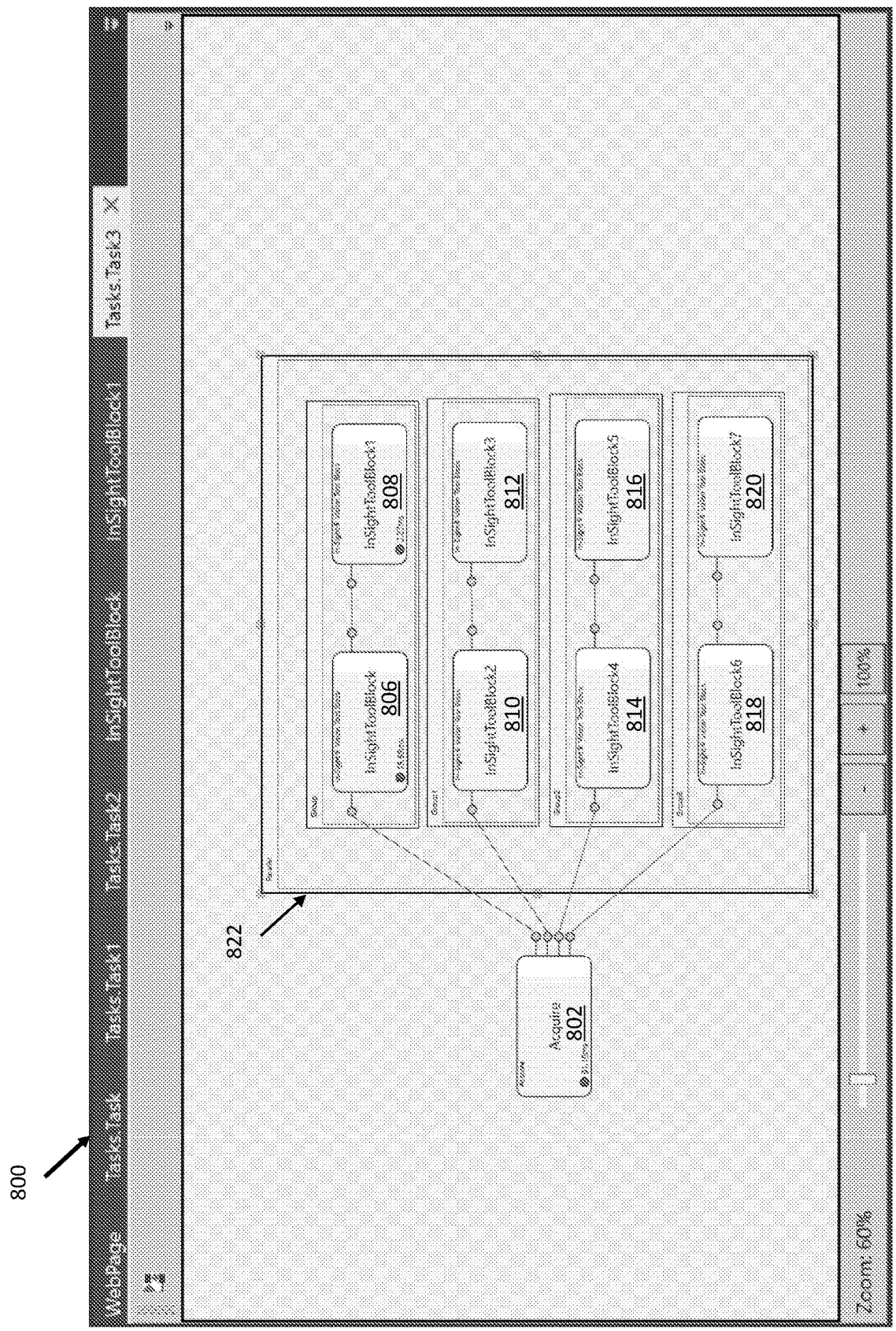
FIG. 8 shows an exemplary program panel of a graphical interface for a visual program with multiple nodes (that each use a spreadsheet) with multiple cameras, according to some embodiments.

FIG. 8 shows an exemplary program panel 800 of a graphical interface for a visual program with multiple nodes (that each use a spreadsheet) with multiple cameras, according to some embodiments. The acquire node 802 acquires image data using four different cameras. The data acquired by each camera is processed by different nodes. The output of one camera is processed by InSightToolBlock 806, and the output of the InSightToolBlock 806 is processed by InSightToolBlock1 808. The output of a second camera is processed by InSightToolBlock3 810, and the output of the InSightToolBlock3 810 is processed by InSightToolBlock2 812. The output of a third camera is processed by InSightToolBlock5 814, and the output of the InSightToolBlock5 814 is processed by InSightToolBlock4 816. The output of a fourth camera is processed by InSightToolBlock7 818, and the output of the InSightToolBlock7 818 is processed by InSightToolBlock6 820. Each of the InSightToolBlocks configured using a different, associated spreadsheet. The InSightToolBlocks are contained within a parallel block 822. Therefore, InSightToolBlocks 806, 810, 814 and 818 each simultaneously perform vision calculations on the data output from the respective camera. Similarly, InSightToolBlocks 808, 812, 816 and 820 run after the first set of InSightToolBlocks.

It is to be understood that the disclosed subject matter is not limited in its application to the details of construction and to the arrangements of the components set forth in the following description or illustrated in the drawings. The disclosed subject matter is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods, and apparatus for carrying out the several purposes of the disclosed subject matter. It is important, therefore, that the claims be regarded as including such equivalent constructions insofar as they do not depart from the spirit and scope of the disclosed subject matter. For example, some of the disclosed embodiments relate one or more variables. This relationship may be expressed using a mathematical equation. However, one of ordinary skill in the art may also express the same relationship between the one or more variables using a different mathematical equation by transforming the disclosed mathematical equation. It is important that the claims be regarded as including such equivalent relationships between the one or more variables.

Although the disclosed subject matter has been described and illustrated in the foregoing exemplary embodiments, it is understood that the present disclosure has been made only by way of example, and that numerous changes in the details of implementation of the disclosed subject matter may be made without departing from the spirit and scope of the disclosed subject matter.

The invention claimed is:

1. A computer-implemented method for creating a graphical program using a graphical programming development environment, the method comprising:
   instantiating a spreadsheet node in the graphical programming development environment, wherein:
      the spreadsheet node graphically represents a portion of a graphical program; and
      the spreadsheet node is associated with a spreadsheet comprising a plurality of cells arranged graphically in a plurality of rows and a plurality of columns, wherein the plurality of cells specify a list of functions to be executed in a computing device as part of the graphical program; and
   generating a human readable file specifying a computer executable version of the graphical program, including the list of functions specified by the spreadsheet in the spreadsheet node.

2. The method of claim 1, further comprising transmitting the human readable file to a controller that is configured to execute the graphical program specified in the human readable file.

3. The method of claim 1, further comprising receiving an execution property of the spreadsheet node indicating the computing device designated to execute computer-readable instructions of the spreadsheet node.

4. The method of claim 3, further comprising:
   determining, at the controller, based on the execution property of the spreadsheet node, that the computing device is designated to execute the computer-readable instructions of the spreadsheet node; and
   transmitting the computer-readable instructions of the spreadsheet node to the computing device for execution of the computer-readable instructions of the spreadsheet node.

5. The method of claim 1, further comprising:
   upon receiving a request to view the spreadsheet associated with the spreadsheet node, displaying the spreadsheet in the graphical programming development environment;
   receiving first data to be associated with a cell in the spreadsheet; and
   populating the cell in the spreadsheet using the first data.

6. The method of claim 1, wherein the computing device is a camera.

7. The method of claim 6, wherein the graphical program is configured to perform a machine vision task.

8. The method of claim 7, wherein the computer-readable instructions of the spreadsheet node are designed to perform machine vision analysis of an image.

9. The method of claim 1, further comprising providing a second spreadsheet node in the graphical programming development environment, wherein the second spreadsheet node is associated with a second spreadsheet designed to be executed at another computing device.

10. The method of claim 1, wherein the spreadsheet node comprises an output terminal, wherein the output terminal is associated with a cell in the spreadsheet indicative of an output of the computer-readable instructions of the spreadsheet node.

11. The method of claim 10, further comprising connecting the output terminal of the spreadsheet node to a terminal of a node of the graphical program to provide the output of the computer-readable instructions of the spreadsheet node to the terminal of the node of the graphical program.

12. The method of claim 1, further comprising providing a visualization interface having a graphical element, and associating the graphical element with a cell in the spreadsheet to display a content of the cell at the graphical element.

13. The method of claim 12, wherein the content of the cell comprises an image, and wherein associating the graphical element with the cell comprises assigning, to the graphical element, a pointer that references the image.

14. The method of claim 12, further comprising displaying a portion of the spreadsheet in the graphical element of the visualization interface.

15. The method of claim 14, further comprising receiving a request to modify a cell of the spreadsheet using the visualization interface.

16. The method of claim 1, further comprising:
   executing the computer-readable instructions of the spreadsheet node at the computing device, wherein executing the computer-readable instructions comprises:
   receiving a pointer to first data to be processed by the computing device;
   determining whether the computing device maintains the first data locally at the computing device;
   upon determining that the first data is maintained locally at the computing device, processing the first data; and
   upon determining that the first data is not maintained locally at the computing device, retrieving the first data from a storage medium referenced by the pointer and processing the first data.

17. The method of claim 1, wherein the computing device comprises a plurality of computing modules, and wherein the method further comprises automatically selecting one or more of the computing modules to execute computer-readable instructions of the spreadsheet node.

18. The method of claim 17, wherein automatically selecting the one or more of the computing modules comprises determining a computation load of the one or more of the computing modules.

19. The method of claim 1, further comprising:
   receiving instructions to populate the plurality of cells in the spreadsheet; and
   based on the instructions, populating the plurality of cells to specify the list of functions.

20. The method of claim 1, wherein the spreadsheet node comprises an input terminal, wherein the input terminal is associated with a cell in the spreadsheet indicative of an input received by the input terminal for processing by a function from the list of functions.

21. A system for creating a graphical program using a graphical programming development environment, comprising:
   a processor in communication with a memory, wherein the processor is configured to run a computer program stored in the memory that is configured to:
   instantiate a spreadsheet node in the graphical programming development environment, wherein:
      the spreadsheet node graphically represents a portion of a graphical program; and
      the spreadsheet node is associated with a spreadsheet comprising a plurality of cells arranged graphically in a plurality of rows and a plurality of columns, wherein the plurality of cells specify a list of functions to be executed in a computing device as part of the graphical program; and
   generate a human readable file specifying a computer executable version of the graphical program, including the list of functions specified by the spreadsheet in the spreadsheet node.

22. A non-transitory computer readable medium having executable instructions associated with a system for creating a graphical program using a graphical programming development environment, operable to cause the system to:
- instantiate a spreadsheet node in the graphical programming development environment, wherein:
  - the spreadsheet node graphically represents a portion of a graphical program; and
  - the spreadsheet node is associated with a spreadsheet comprising a plurality of cells arranged graphically in a plurality of rows and a plurality of columns, wherein the plurality of cells specify a list of functions to be executed in a computing device as part of the graphical program; and
- generate a human readable file specifying a computer executable version of the graphical program, including the list of functions specified by the spreadsheet in the spreadsheet node.

\* \* \* \* \*